Inventor
Lyle Slaybaugh
By
Hary, Parker, Justner & Cullinan
Attys

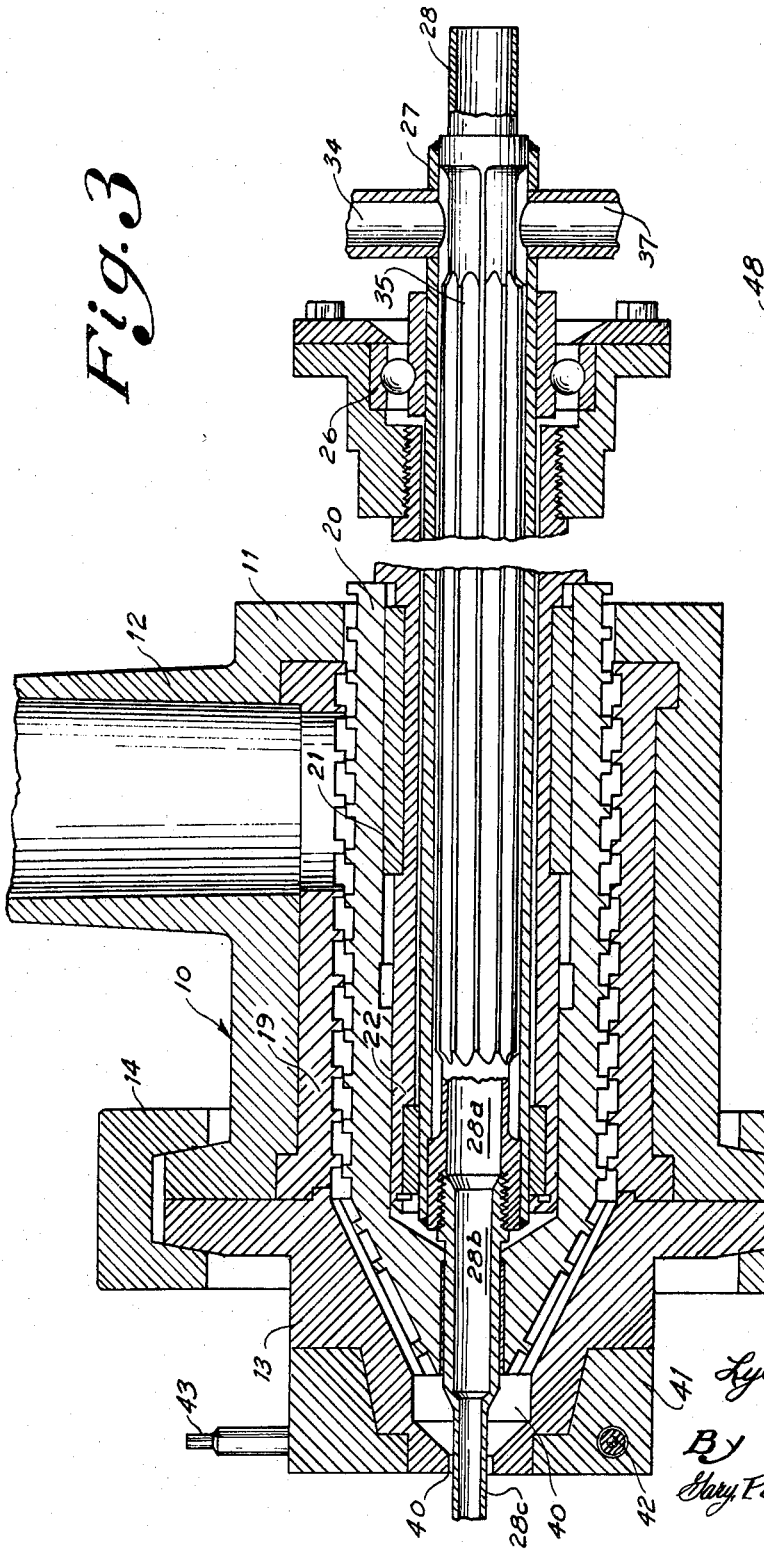

United States Patent Office 3,480,445
Patented Nov. 25, 1969

3,480,445
METHOD AND MEANS FOR MAKING A COMPOSITE FOOD PRODUCT
Lyle Slaybaugh, Battle Creek, Mich., assignor to Kellogg Company, Battle Creek, Mich., a corporation of Delaware
Filed Oct. 21, 1965, Ser. No. 499,612
Int. Cl. A23l 1/10, 1/18
U.S. Cl. 99—83      10 Claims

ABSTRACT OF THE DISCLOSURE

A method and apparatus for making a composite food product by extruding a puffed cereal product in ready-to-eat form in the shape of a tube and jointly extruding and filling said tube with a different food product while cooling the latter.

---

This invention relates to the production of a novel ready-to-eat foot product of composite character and to the novel process and apparatus for making it.

More particularly the product of the present invention relates to the production of an annular cereal composition of puffed and crisp cellular character filled with another food product such as cheese or dairy compositions, fruits, meats, and the like.

It is an object of the present invention to extrude a composition of raw cereal particles, such as corn meal or other cereal, either alone or in combination with another cereal such as for example rye, together with flavoring and coloring matter, and a small amount of moisture insufficient to form a dough and to carry out extrusion of the moistened mixture under pressure and self generated heat sufficient to cook the cereal and to cause it to be extruded in a puffed or expanded cellular annular ready-to-eat form. At the same time a filler is extruded into the annulus of the cereal extrudate so as to form a well filled composite, and in a continuous manner.

The issuing product is desirably cooled after being extruded and continuously severed into short lengths of desirable size.

The method and apparatus are characterized by novel joint extrusion means whereby the cereal grain is caused to be cooked and the moisture vaporized by heat generated in the extruder while the cheese or other filling is jointly extruded therewith and continuously cooled so as to inhibit heat modification thereof.

Other objects and advantages of the present invention, the economies thereof, and the details of the process and arrangement of apparatus will be apparent from the following specification and accompanying drawings, wherein:

FIG. 3 is a relatively enlarged fragmentary longitudinal section of a portion of the apparatus shown in FIG. 2.

FIG. 4 is a perspective view of the product of the present invention.

Figure 1:
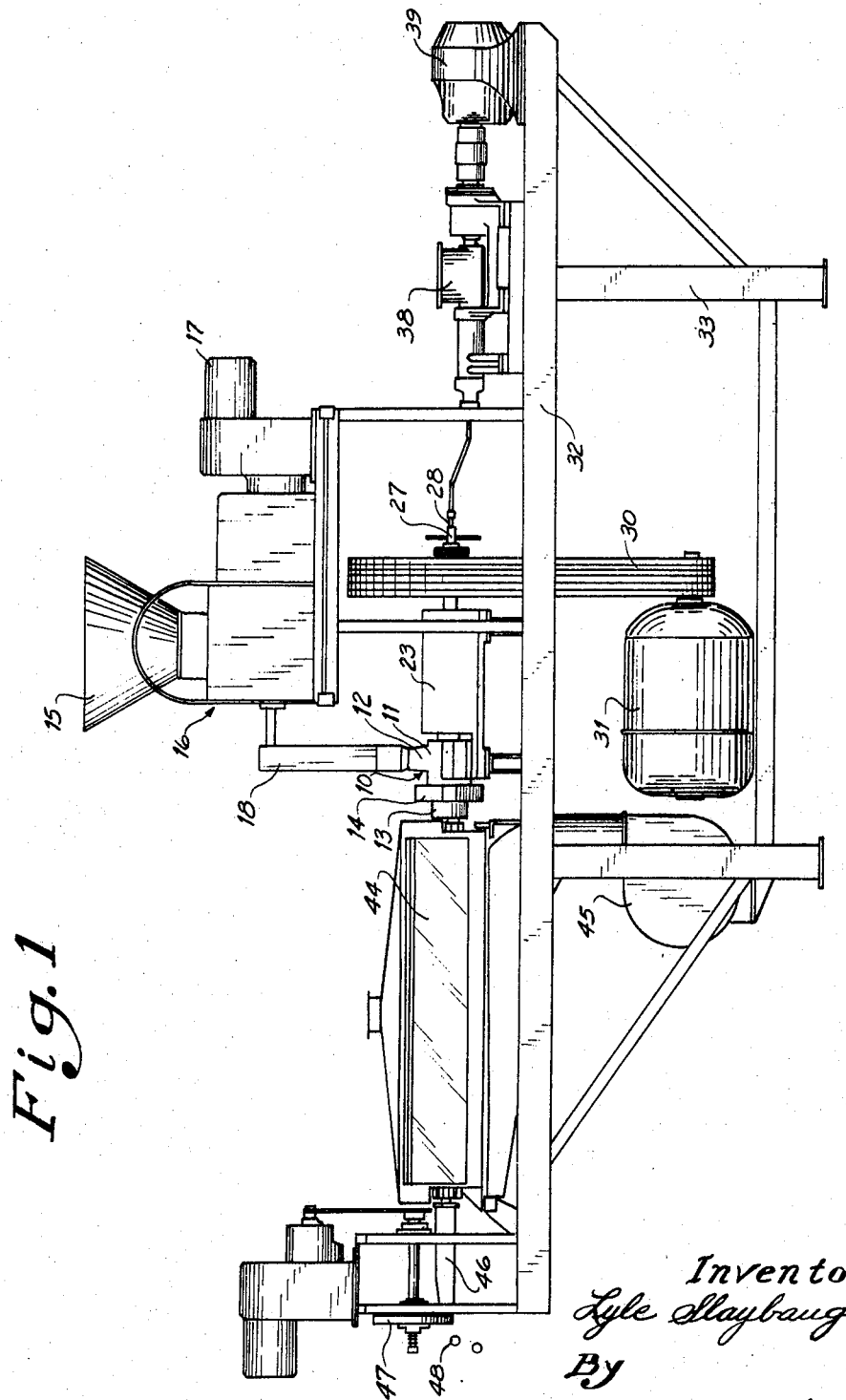
FIG. 1 is a side elevational view of an arrangement of apparatus of the present invention.
Figure 2:
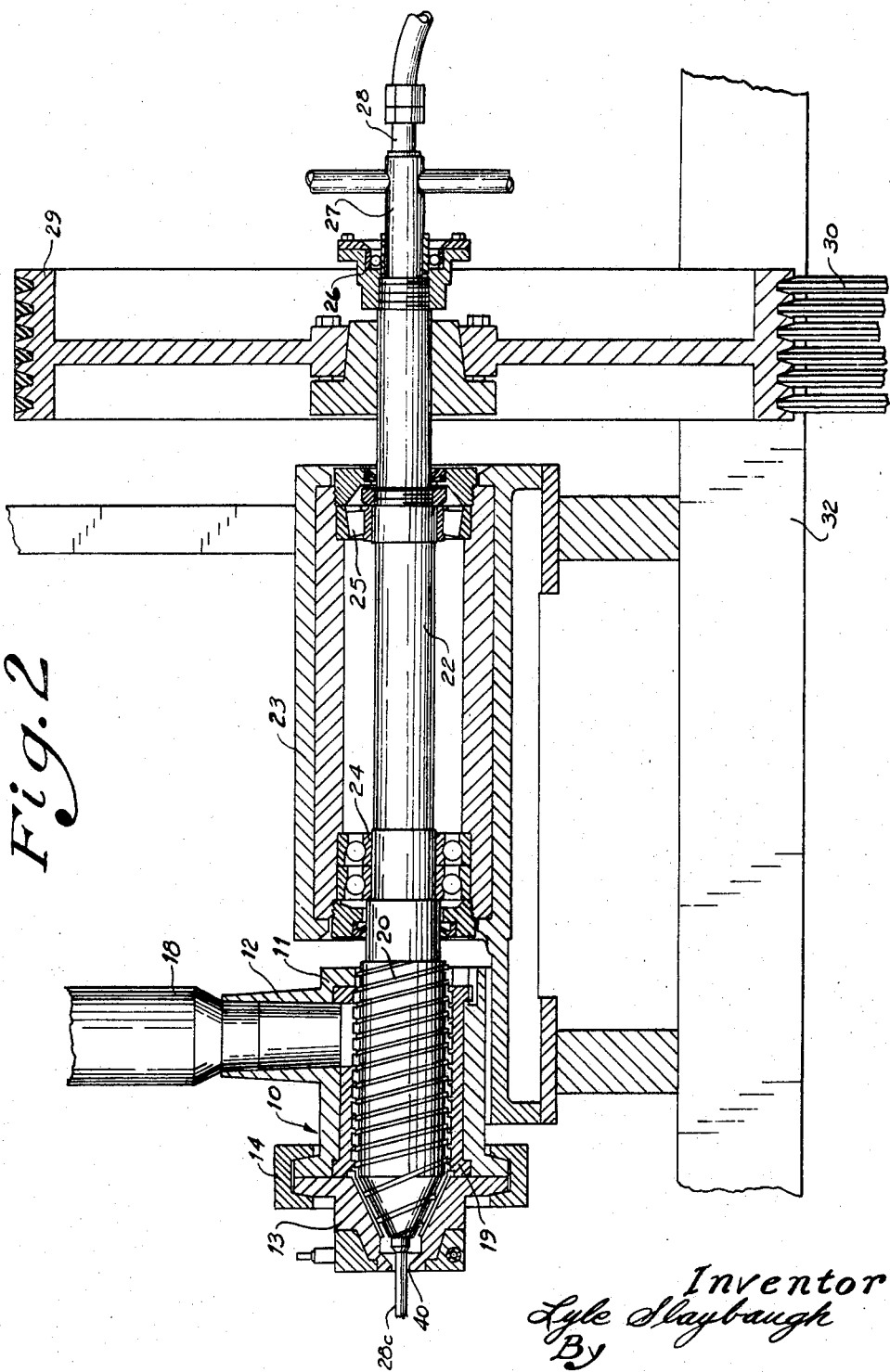
FIG. 2 is a relatively enlarged fragmentary longitudinal section of a portion of the apparatus of FIG. 2.

Referring to the drawings, the reference numeral 10 generally indicates an extruder which comprises a split housing 11 having a cereal inlet 12 adjacent one end and a die 13 engaged thereto at the opposed end by the die nut 14. The extruder is continuously fed with a moistened mixture of cereal particles supplied through the hopper 15 of the feed system generally indicated as 16 and further comprising a metering system and feed screen, not shown, a drive motor 17 and delivery conduit 18 leading to feed inlet 12.

The extruder housing 11 has a fixed worm sleeve secured thereto provided with double pitch left-hand threads 19 which mate with the extruder cone worm 20 having double pitch right-hand threads. The worm 20 is keyed as at 21 to the hollow drive shaft 22, the latter being rotatably supported in the bearing housing cylinder 23 on the bearings 24 and 25, and outwardly thereof by the bearing 26 embracing the fixed cooling tube 27 and filling tube 28.

The worm drive shaft 22 is rotated by means of the pulley 29, belts 30 and motor 31 disposed beneath the base form 32 supported on the standards 33.

Cooling water enters the inlet tube 34 and flows between the cooling tube 27 and the filling tube 28, and circulates about its longitudinal fins 35 within the extruder to cool the filling material 36 being extruded through the tube 28, and is discharged through the exit tube 37.

The cheese etc. filling 36 is supplied through the open throat food pump 38 and is fed by means of the pump drive means 39 into the filling tube 28. As indicated in FIG. 3, the filling tube 28 is successively reduced in cross sections as at 28a and 28b and terminates in the reduced tube section 28c which passes through, and preferably extends outwardly of die 13 in spaced relationship to the aperture 40 thereof to leave an annular opening between them. The progressive reduction in diameter of feed tube 28 makes it possible to pump the cheese, etc. fill at pressures of up to about 400 pounds per square inch.

At the same time the moistened cereal is introduced at a rate of feed correlated to the filling, to hopper 15 as previously indicated, and therefrom to between the fixed screw 19 and the rotatable screw component 20, wherein it is moved forwardly under pressure to the blending chamber or reservoir pocket 40 adjacent the exit end of die 13 whereat the rotatable screw component 20 terminates. Here the cereal particles under the influence of the added moisture and the built-up pressure which can be as high as 2000-3000 pounds per square inch becomes cooked and continues to issue forth from the die opening 40 in the form of the annulus about the filling tube portion 28c. Thereupon the moisture vaporizes and upon entering the atmosphere at the reduced pressure thereof the cooked cereal expands radially both outwardly and inwardly to assume a cellular form.

To prevent the annular cereal body from expanding inwardly and closing the annulus, the filling tube 28c extends outwardly of the die a sufficient length so as to substantially fix the diameter of the issuing annular cereal body. The long the extension of fill tube 28c the greater is the diameter of the cereal tube opening and thus the greater the amount of fill. Even so, the filling issuing from exit tube 28c, which also is under pressure, at the same time expands sufficiently so as to snugly fill the annular cereal body.

In order to insure sufficient heat in the chamber 40, particularly at the start of the operation, the forward end of the die is provided with the ring 41 having disposed therein electrical resistance heating element 42 to supply the energy from the source indicated at 43. When the device has been in operation for a sufficient time the heat source may be shut off. To provide good heat transfer the ring 41 may be of a good conductor metal such as aluminum. The filling tube nozzle portion 28c can be of steel but if desired can also be of plastic material such as Teflon or others, to evenly control heat transfer from the pocket 40 to the food filler.

After discharge of the filled cereal tube it is desirably passed through the chamber 44 supplied with cooling air through the blower 45 to cool the product and substantially remove residual moisture, whereupon it moves through the cut-off guide tube 46 and past the cut-off plate in the form of the rotary bayonet knife 47 whereat the composite product is cut into short lengths 48 of desired size comprising annular cellular crisp cereal body 49 filled with the cheese, etc. material 36 as shown in FIG. 4.

The product 48 can be for example in proportions of from about 30% fill to 70% cereal body, and from about 70% filled to about 30% cereal body by volume, as desired.

While I have shown and described the preferred embodiment of my product, process and apparatus, it will be understood that changes may be made in the details without departing from the scope of the invention as set forth in the following claims.

I claim:

1. The method of making a ready-to-eat food product comprising an annular body of cellular, crisp, cooked cereal, the annulus thereof being filled with a different edible food product, which comprises introducing to an annular extrusion zone a compoistion comprising raw cereal particles and a small amount of water insufficient to form a dough, extruding the moistened cereals in annular form through said zone under sufficient pressure and heat generated by extrusion whereby the cereal is cooked and the moisture vaporized by the generated heat, and the cooked cereal expands to a cellular condition upon exiting from the extrusion operation, and jointly extruding with said moist cereals and filling the annular cavity thereof with a different food product while cooling the latter to inhibit heat modification thereof by the heat generated by extrusion and cooking of the cereal, and severing the resulting cellular composite filled tube into relatively short lengths.

2. The method of claim 1 wherein the annular body is comprised of puffed corn.

3. The method of claim 1 wherein the filling is comprised of cheese.

4. The method of claim 1 wherein the composite filled tube is passed through a cooling zone after extrusion and before severing.

5. Apparatus for making a composite food product comprising an extruder, an extrusion die, an axial tube in said extruder projecting through and outwardly of the extrusion die and providing an annular path within said extruder and an annular die orifice, means for introducing an edible food product to said tube and for extruding it therefrom in substantially unchanged condition, a cooling tube embracing said axial tube including means for introducing cooling water between said tubes, means for introducing cereal grain particles and moisture about said cooling tube and means for extruding them under pressure and heat generated by said pressure in the form of a ready-to-eat, expanded annular cereal food product embracing the food extruded from said tube.

6. The apparatus of claim 5 comprising a feed screw terminating in a convergent portion at a compression chamber of relatively restricted area immediately in advance of but spaced from the die orifice.

7. The apparatus of claim 5 comprising means for continuously cooling said axial tube.

8. The apparatus of claim 5 wherein the axial tube terminates forwardly and outwardly of said die orifice whereby to minimize expansion of the cereal extrudate in an inner radial direction.

9. The apparatus of claim 5 including a cooling chamber for receiving the extrudate upon leaving the die orifice, and means for thereafter severing the extrudate into desired lengths.

10. The apparttus of claim 5 wherein said axial tube is fixedly retained within a rotatable screw component of said extruder.

References Cited

UNITED STATES PATENTS

| | | | |
|---|---|---|---|
| 1,265,853 | 5/1918 | Wiseman. | |
| 2,714,861 | 8/1955 | Castronuovo. | |
| 2,954,296 | 9/1960 | Clausi et al. | 99—82 |
| 3,104,976 | 9/1963 | Tolley | 99—86 |
| 3,310,006 | 3/1967 | Hasten et al. | 107—1 |
| 3,366,484 | 1/1968 | Weiss et al. | 99—83 |

RAYMOND N. JONES, Primary Examiner

U.S. Cl. X.R.

99—238